United States Patent [19]

Budrose

[11] 4,163,134
[45] Jul. 31, 1979

[54] SAFETY JUMPER CABLES

[75] Inventor: Charles R. Budrose, Melrose, Mass.

[73] Assignee: Upaya, Inc., Saugus, Mass.

[21] Appl. No.: 849,310

[22] Filed: Nov. 7, 1977

[51] Int. Cl.² ............... H01H 13/08; H01H 21/10
[52] U.S. Cl. ................. 200/157; 200/51.09; 320/47; 339/29 B
[58] Field of Search ............ 200/61.58 R, 61.85, 200/51 R, 51.09, 51.1, 157; 339/29 R, 29 B, 228; 320/25-28, 47, 48, 54, 55, 57, 59, 2, 3; 340/248 Y, 249

[56] References Cited

U.S. PATENT DOCUMENTS

| | | | |
|---|---|---|---|
| 3,062,988 | 11/1962 | Medlar | 320/25 X |
| 3,120,632 | 2/1964 | Hopt et al. | 320/2 |
| 3,259,754 | 7/1966 | Matheson | 320/25 X |
| 3,267,452 | 8/1966 | Wolf | 339/228 X |
| 3,281,816 | 10/1966 | Raymond | 320/25 X |
| 3,343,057 | 9/1967 | Smith | 320/55 X |
| 3,409,816 | 11/1968 | Foster | 320/57 |
| 3,470,440 | 9/1969 | Rheingold et al. | 320/25 |
| 3,700,999 | 10/1972 | Gourse | 320/26 |

*Primary Examiner*—Herbert F. Ross
*Attorney, Agent, or Firm*—Wolf, Greenfield & Sacks

[57] ABSTRACT

A number of different embodiments of jumper cables that are constructed to prevent sparking at the batteries where the cables are connected and disconnected. Each embodiment includes a switch means located at the middle of the cables along their length, spaced from the batteries, and in the form of either a hermetically sealed snap switch or a jack and plug arrangement. The switch means may also comprise a timer switch that automatically opens after a predetermined time period of connection. One feature of this invention incorporates jumper cable clamps that operate a cable connected to a power switch so that upon attachment or removal of the cable clamps, the power switch is opened to alleviate spark problems. A further arrangement allows current flow through the battery jumper cables only after all clamp switches are closed and there is a proper polarity matchup between the batteries.

15 Claims, 9 Drawing Figures

SAFETY JUMPER CABLES

BACKGROUND OF THE INVENTION

The present invention relates in general to an improved jumper cable construction and is concerned, more particularly, with jumper cables that are safe to use. The purpose of this invention is to prevent sparking at the battery terminals where the jumper cables are connected and disconnected.

Many people use jumper cables usually in an emergency situation to start a vehicle having a dead battery by jumpering the cables to another vehicle having a charged battery. The typical cables include two lengths of heavy battery cable with clamps at the ends of both lengths of cable. There is a danger in the connecting of a charged automobile battery to a relatively discharged battery. The sparking associated with the connecting and disconnecting of the cables can, and often does, ignite the escaping hydrogen at the batteries causing an explosion. This explosion may result in the death of a person and in many cases causes severe injuries such as acid and flash burns and possible blindness.

Accordingly, it is an object of the present invention to provide improved jumper cables that are safe to use and that are constructed to eliminate any sparking problems usually associated with the connecting and disconnecting of the cable clamps at the battery terminals. In accordance with this general object of the invention there is described hereinafter a number of different embodiments of the invention all of which prevent the sparking at the battery terminals.

A further object of the present invention is to provide a more sophisticated jumper cable system including improved cable clamps which operate to prevent sparking at connection and disconnection.

Still a further object of the present invention is to provide an improved jumper cable system which detects whether the cables are connected properly with regard to polarity at the battery terminals.

SUMMARY OF THE INVENTION

To accomplish the foregoing and other objects of this invention the safety jumper cables comprise a pair of wire cables with each cable having clamp means at both ends thereof. To prevent the sparking there is provided a hermetically sealed snap switch preferably at the center along one or even both of the cables. In an alternate embodiment a jack and plug may be provided at the center of one or both of the cables, arranged so that electrical contact is made and broken within a hermetically tight enclosure formed by bringing the jack and plug together. It is the intent of use of the switch and the jack and plug that the user turns the switch on or engages the plug and jack only after the cables have been connected to the individual batteries.

In an alternate embodiment the switch may be replaced by a wind-up mechanical timer or a dashpot timer so that after, for example, five minutes the switch automatically opens. This means that any time that the cables are used after the timer time period the switch is automatically in the off position. This would eliminate the possibility of removing the cables with the switch remaining in the on position.

Even with the use of a timer or timer switch, it is still possible for one to disconnect the cables before the time period of the timer thereby causing sparking upon disconnection. Accordingly, in another embodiment of the invention each jumper cable clamp is connected via a flexible cable to a centrally located switch. This arrangement operates so that upon starting to open any clamp the switch is tripped to the open position. Thus, attaching the jumper cables automatically opens the switch and removing the cables also automatically opens the switch.

Still another embodiment is essentially an electrical equivalent of the latter embodiment and employs four switches, one in each clamp and all of which are normally closed when the clamps are at rest. The opening of a clamp opens its associated switch. In this embodiment the four switches are wired in series with an actuating switch which controls a hermetically sealed power solenoid located at the center of the cable, which when actuated, closes the circuit through the cable. There is a latching switch on the solenoid which holds the solenoid energized after the actuating switch is closed. The opening of any of the clamp switches releases the solenoid.

In a final embodiment of the invention there is a jumper cable system which includes, in addition to the clamp operated switches, logic circuit means to determine whether the cables are connected properly with regard to the polarity at the batteries. With this system, connection at the battery cables is allowed only after all clamp switches are closed and there is a proper polarity match-up between the batteries.

DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
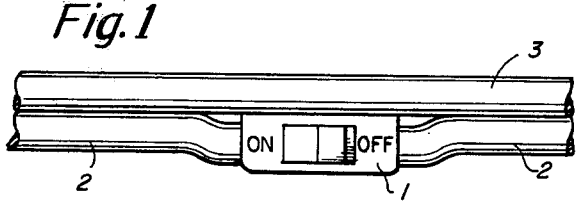
FIG. 1 is a fragmentary view showing a center section of a battery jumper cable with an on-off snap switch in one lead.

An ordinary set of battery jumper cables comprises two heavy wire gauge cables, each of which is insulated and each of which has clamps at both ends thereof for connection to battery terminals. FIG. 1 shows one embodiment of th present invention in a simplified form wherein an on-off snap switch 1 is installed in the battery jumper cable 2. The switch 1 may be of conventional construction and preferably is firmly secured to the other battery cable 3. The switch 1 may be secured to the cable 3 by means of an epoxy glue. The opposite ends of the cables 2 and 3 have clamps which are not shown in FIG. 1 but which are connected on one side to the terminals of one battery and on the other end to the terminals of the other battery. The switch 1 is maintained in its off position normally but once the cables have been connected at the battery terminals the switch may then be moved to the on position to permit the jump starting of the vehicle having the dead battery.

Figure 2:
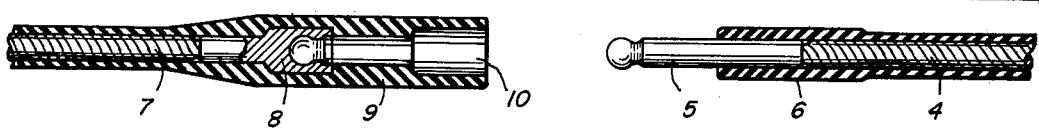
FIG. 2 shows in cross-section, a plug and jack arrangement including a rubber sheath to seal the jack and plug when they are making and breaking contact.

FIG. 2 shows an alternate arrangement in the one shown in FIG. 1 depicting only a single cable of the pair of cables. In this arrangement the battery cable 4 is connected to battery cable plug 5. The cable or wire 4 may be connected to the plug by virtue of the plug being hollow at its end accommodating the wire and permitting the plug to be crimped about the wire. Both the cable or wire 4 and the plug 5 are surrounded by thick rubber insulation 6. The other battery cable wire 7 is connected to a jack 8. A thick rubber insulating sleeve 9 surrounds the jack 8 and extends beyond it forming a receptacle 10. When plug 5 is inserted into jack 8, the surrounding rubber insulation 6 mates snugly with the insulating sleeve 9 within the receptacle 10. The construction is designed so that there is a seal between the insulation 6 and the sleeve 9 before there is actual electrical connection between the plug and jack. Thus, if there is any sparking between the plug and jack this occurs only within the confines of the insulation provided by the insulation sleeves 6 and 9. Similarly, upon disconnection any sparking would occur prior to a break between the insulation sleeves. FIG. 2 shows only one of the cables but it is understood that the other cable could also be provided with a similar jack and plug or could be a continuous cable as depicted in FIG. 1.

Figure 3:
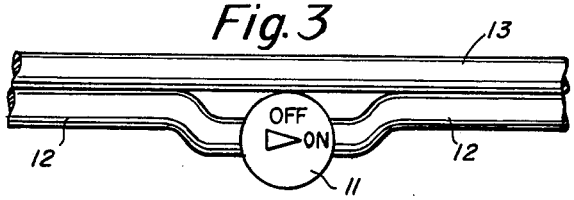
FIG. 3 is an embodiment similar to that shown in FIG. 1 taken at a center section of a battery cable with a timer switch in one lead.

FIG. 3 is a view similar to that shown in FIG. 1 with the snap switch 1 replaced by an on-off timing switch 11. In this embodiment the switch 11 is installed in the battery jumper cable 12 and is firmly affixed to the cable 13 such as with the use of an epoxy glue. The switch 11 may be of conventional design and may, for example, be a five minute timing switch. After the cables are attached to the battery terminals the switch may be moved from the off position to its on position. The switch then times out after a period of approximately 5 minutes and then at that time reverts to its off position. This use of a timer switch thus automatically disconnects the cables after a period of time so that any disconnection that is made after the time period will not cause any sparking.

Figure 4:
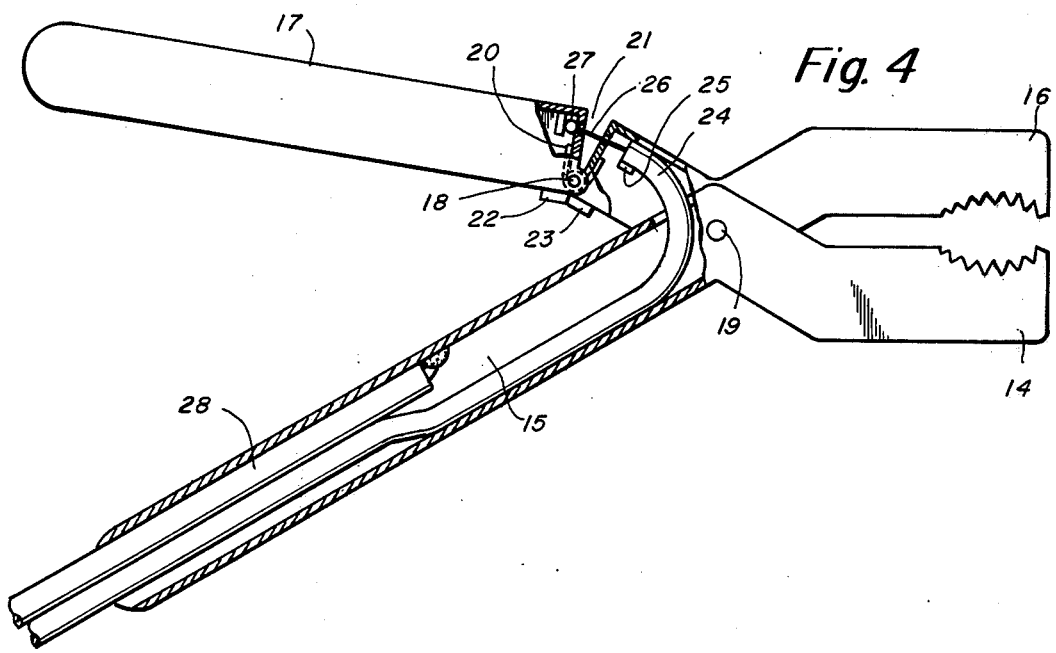
FIG. 4 shows a jumper cable clamp with a flexible cable operable by breaking one handle of the clamp.
Figure 5:
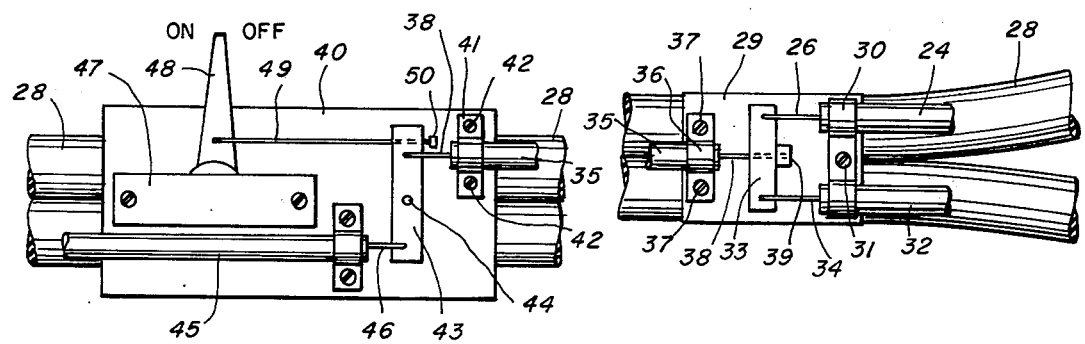
FIG. 5 shows the arrangement at the center of the cables showing two of the flexible cables and the common actuating mechanism for throwing a battery cable switch to the off position.

In accordance with another embodiment of the present invention reference is made to FIGS. 4 and 5. As depicted in FIG. 4 a jumper cable clamp is shown as comprising a jaw 14 which connects to handle 15 and a jaw 16 connects to handle 17 by means of a hinge pin 18. Both of the jaws and their associated handles are pivotally connected with the use of a pin 19. A spring preferably is wrapped around the pin 19 and normally urges the jaws 14 and 16 toward each other. This biasing spring about the pin 19 is not shown in the drawings but is a conventional spring used in arrangements of this type. A spring 20 is associated with the hinge pin 18 and normally urges the handle 17 toward the jaw 16. Thus, in the normal relaxed position of the handle 17 there is a gap 21 that is closed. FIG. 4 shows the handle 17 partially actuated with the jaws 14 and 16 partially open. The opening limit of gap 21 is controlled by stops 22 and 23 which are securely attached to handle 17 and jaw piece 16, respectively. These stop blocks 22 and 23 limit the movement of handle 17 relative to the jaw piece 16.

The construction of FIG. 4 also includes the flexible cable sheath 24 which is firmly attached to jaw piece 16 by means of clamp 25. The sheath 24 is for housing a longitudinally movable cable 26 which terminates at one end in end ball 27. The ball 27 is firmly held in the handle 17 as shown in FIG. 4. Movement of the handle 17 relative to the jaw piece 16 slides the movable cable 26 in and out of the flexible cable sheet 24.

The battery jumper cable 28 is attached to handle 15. For example, the cable 28 may be welded to the inner surface of the handle 15. Preferably, the sheath 24 and associated cable 26 are suitably secured to the battery jumper cable 28 as depicted in FIG. 4.

In operation, the squeezing of handles 15 and 17 toward each other initially causes handle 17 to move relative to jaw piece 16. This action pulls cable 26 through the flexible cable sheet 24. The stop blocks 22 and 23 make contact and limit the opening of the gap 21. These blocks stop the relative movement between handle 17 and jaw piece 16. Further pressure on handle 17 is then transferred by the stop blocks 22 and 23 to jaw piece 16 causing it to move away from jaw 14. Thus, manipulating the battery cable clamp, by squeezing the handles together first initiates a movement of the longitudinally movable cable 26 through the cable sheath prior to the actual opening of the jaws 14 and 16.

FIG. 4 shows one of the cable clamps, it being understood that a similar cable clamp is associated with each end of both of the cables of the battery jumper cable set thereby providing a total of four cable clamps of the type shown in FIG. 4. In association with each of these cable clamps there is provided a centrally actuated switch 48 shown in FIG. 5 which is moved to its off position any time that anyone of the cable clamps is released for either connection or disconnection of the cable clamps from a battery terminal.

With reference to FIG. 5, the base plate 29 is mounted on the jumper cable set at the "Y" where the cables divide into two separate cables as depicted in FIG. 5. There is a similar mounting plate at the other end of the set of cables where the cables also divide into two separate cables. The flexible cable sheath 24 is firmly attached to base plate 29 by means of a clamp 30. The clamp 30 is secured to the base plate 29 by a securing screw 31. This clamp 30 also secures a second flexible cable sheath 32 which comes from another jumper cable clamp (not shown) paired with the above-described jumper cable clamp, and preferably identical to it.

The movable cables 26 and 34 both attach to the walking beam 33. A further cable sheath 35 is attached to the base plate 29 by means of the clamp 36 and associated screws 37. The movable cable 38 associated with sheath 35 passes through the walking beam 33 and is firmly attached to block 39. In operation, when the cable 26 is drawn into the flexible cable sheath 24 by operation of the associated cable clamp, the walking beam 33 moves around a pivot point formed by the stationary end of movable cable 34. This movement is transferred through block 39 to cable 38 which is moved out of the sheath 35. Likewise, when cable 34 is moved into its associated sheath 32, movement is produced in the cable 38. Movement of both cables 26 and 34 simultaneously will produce also movement in the cable 38. Thus, the entire mechanism on the base plate 29 functions to transfer the cable movement from either or both of a pair of jumper cable clamps to one final movable cable which is cable 38 within the sheath 35 shown in FIG. 5. Operation of either clamp will produce movement of this cable 38. Similarly, there is a like arrangement on the other end of the cable.

FIG. 5 also shows the base plate 40 which is mounted at the center of the battery jumper cables. The flexible cable sheath 36 is shown firmly attached to the base plate 40 by means of the clamp 41 and its associated screws 42. The other end of movable cable 38 is pivotally attached to a cross bar 43 which can rotate around a center shaft 44. Shaft 44 extends from the base plate 40. The sheath 45 is equivalent to the sheath 35 but comes from the opposite end of the jumper cable. Snap switch 47 is mounted to base plate 40 in a suitable manner and connects into the jumper cable 28 for permitting connection of the two ends of the cable 28. The lever arm 48 of the switch 47 is connected to cross bar 43 by a connecting link 49 which is pivotally attached to the lever arm 48. The connecting link 49 passes through the cross bar 43 and is secured to block 50.

In operation, the squeezing of any jumper cable clamp is communicated to the cross bar 43 causing it to rotate in a clockwise direction as viewed in FIG. 5. If the cable 38 or the cable 46 is pulled into their respective sheaths 35 or 45 then the cross bar 43 will rotate clockwise and pull the lever arm 48 to the right by means of the link 49 to thus turn the switch 47 to its off position. Switch 47 is turned off automatically initially before attaching or removing any jumper cable clamp. Once all of the clamps have been relaxed to the position wherein the gap 21 of FIG. 4 is closed, then the switch 47 assumes its normal on position. Alternatively, after all clamps are relaxed the switch 47 may require manual arming for operation.

Figure 6:
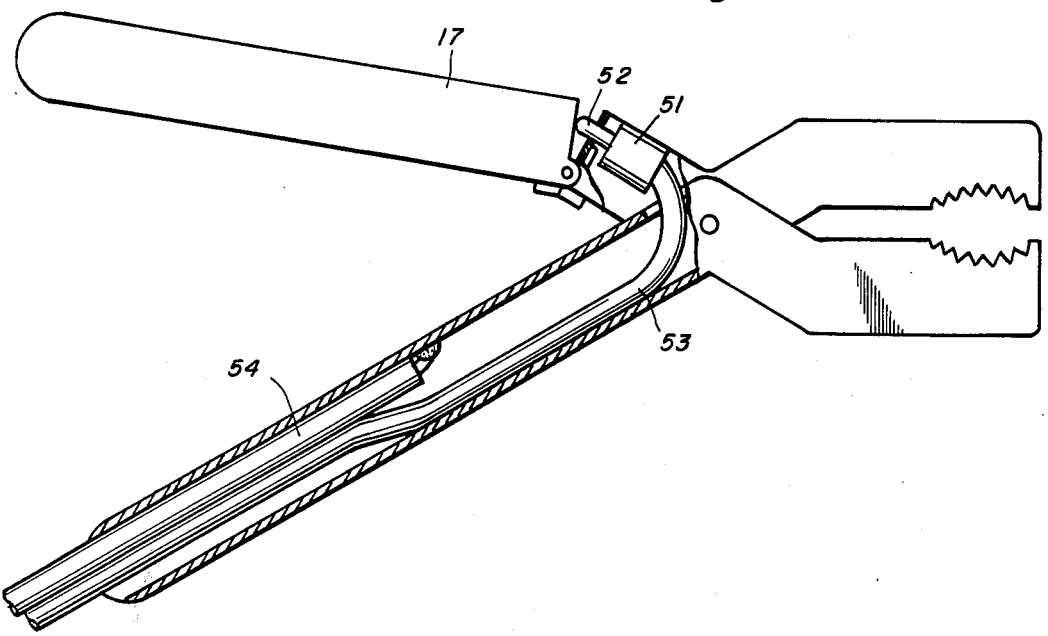
FIG. 6 shows a jumper cable clamp with an electrical switch operable by breaking one handle of the clamp.
Figure 7:
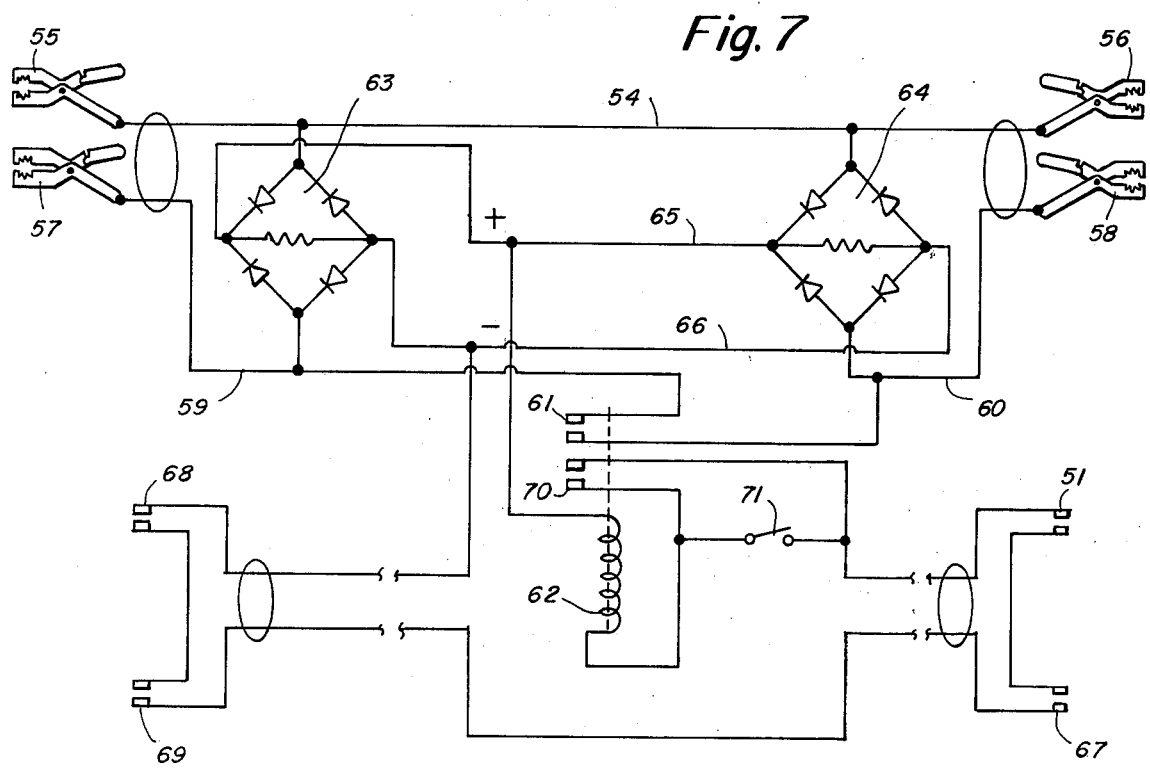
FIG. 7 is a wiring diagram of a further embodiment of the invention with each jumper cable clamp switch wired in series and also showing the associated actuating and locking circuitry.

The jumper cable clamp of FIG. 6 is used in association with the wiring diagram of FIG. 7. The construction of the jumper cable clamp of FIG. 6 is quite similar to the jumper cable clamp shown in FIG. 4 and the complete construction and will not be discussed in detail. In place of the cable 26 and its associated sheath 24 shown in FIG. 4, there is a switch 51 which is a normally open single pole single throw switch. The switching actuating plunger 52 is normally extended to the left as shown in FIG. 6. Movement of handle 17 actuates switch 51 through the actuating plunger 52. When the handles are squeezed together, switch 51 is opened. When the clamp is on a battery terminal the biasing force of a spring such as spring 20 shown in FIG. 4 closes the switch 51. A two-wire cable 53 extends from the switch 51 and follows the battery cable 54.

FIG. 7 is a wiring diagram of this embodiment of the jumper cable system. Each of the battery cable clamps 55–58 preferably is of the type shown in FIG. 6 with each clamp having extending therefrom essentially three wires including the relatively heavy power wire such as cable 54 and two control wires such as found in cable 53. In the diagram of FIG. 7 the power wires are shown separate from the control wires. For example, cable 54 is one main jumper cable that connects the jumper cable clamps 55 and 56, while the switch 51 which is associated with clamp 56 has the control wires extending therefrom.

In FIG. 7 the jumper cable clamps 57 and 58 are connected to cables 59 and 60, respectively, and these cables are in turn wired directly to heavy duty contacts 61 of the locking solenoid 62. The diagram of FIG. 7 also includes bridge rectifiers 63 and 64. The rectifier 63 is coupled across cables 54 and 59 while the rectifier 64 is coupled across cables 54 and 60. The bridges 63 and 64 are connected so as to deliver a positive voltage to wire 65 and a negative voltage to wire 66 regardless of the polarity of connection of the jumper cable clamps at the battery terminals.

As previously mentioned, each one of the battery cable clamps has a switch associated therewith. Thus, in FIG. 7 the switches 51, 67, 68 and 69 are associated respectively with the battery cable clamps 56, 58, 55 and 57. These switches are wired in series from the negative voltage line 66 to the locking of latching contact 70. Actuating switch 71 is wired in parallel with this latching contact 70. The switch contacts 61 and 70 are normally open when the solenoid 62 is de-energized. The actuating switch 71 is preferably a normally-open pushbutton switch. Actuation of the relay coil 62 requires operation of the switch 71 so as to impress the operating voltage across the relay coil.

The four jumper cable clamps 55–58 are attached to the terminals of the two batteries, one of which is in a charge condition and the other of which is discharged. The clamps 55 and 56 are connected to one polarity while the clamps 57 and 58 are connected to the other polarity. It does not matter which polarity they are connected to as either or both bridges develops the appropriate battery voltage between wires 65 and 66. Also, each battery cable clamp set may be used with either battery. When all of the clamps are attached and released by the hand, all of the switches 51, 67, 68 and 69 are closed, thereby arming the actuating switch 71 and the contact 70. The depressing of switch 71 energizes solenoid coil 62 causing it to close the contacts 61 and 70. The contact 70 latches the solenoid in its closed position. Simultaneously, contact 61 provides a closed path between the cables 59 and 60. The solenoid 62 is maintained in its energized position as long as all of the switches 51, 67, 68 and 69 are closed. Operation of any one or more of the jumper cable clamps will open its associated switch causing the solenoid 62 to become de-energized thereby disconnecting the cables 59 and 60. The clamps are designed as shown in FIG. 6 so that the switches such as switch 51 in FIG. 6 moves to its open position before the clamp is actually opened and releasable from the battery terminal. This operation also occurs upon closing and in this instance the clamp is fixed on the terminal and the switch 51 is moved to its closed position thereafter upon complete release of the handles of the clamp. The connecting and disconnecting of the system always occurs through the relay contact 61. The bridge rectifiers 63 and 64, solenoid 62 and actuating switch 71 are preferably all housed in a sealed unit which is arranged at the middle of the battery jumper cable.

Figure 8:
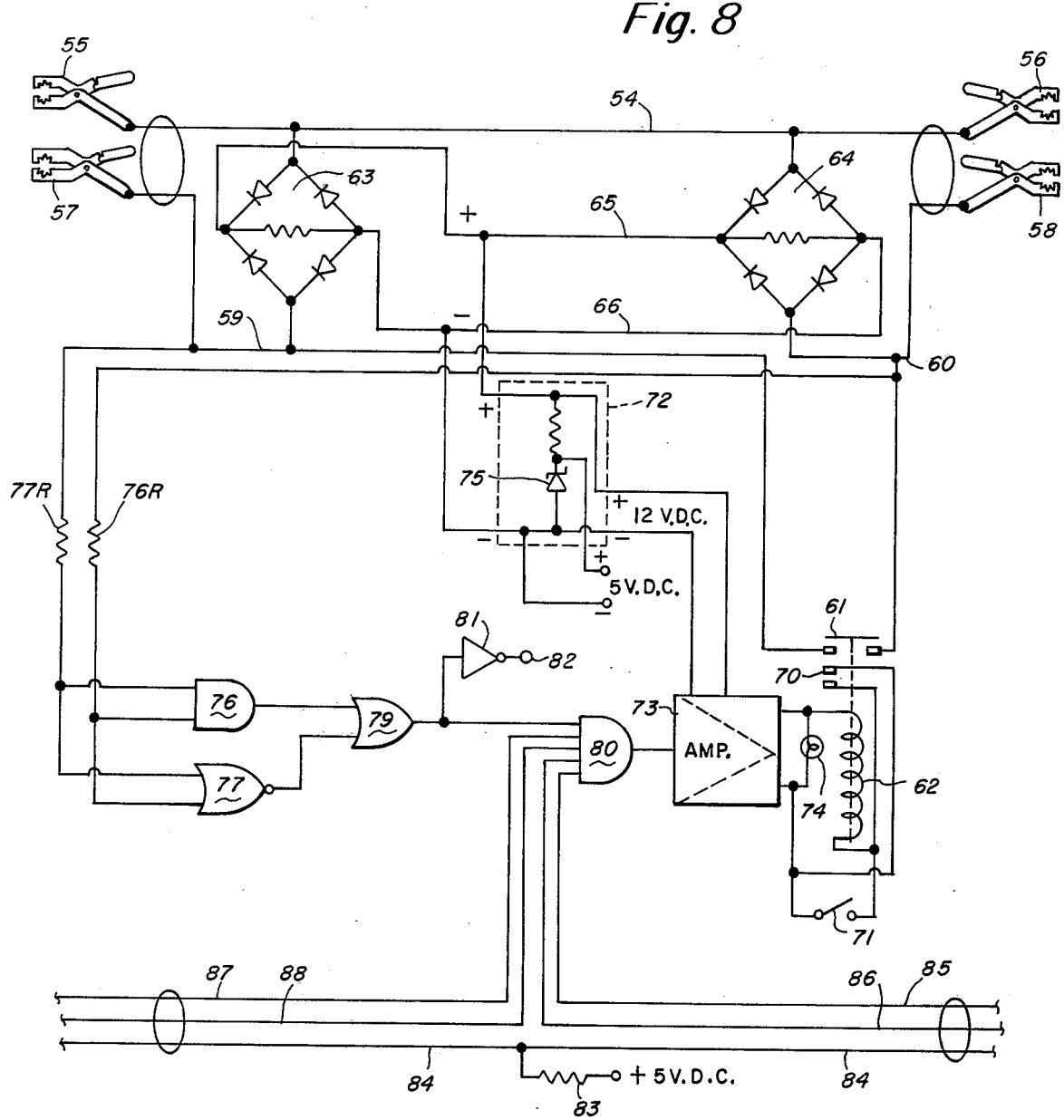
FIG. 8 is a wiring diagram of still another embodiment of the invention including circuitry for detecting jumper cable switch closings and the polarity of battery connections.

The diagram of FIG. 8 is quite similar to the one shown in FIG. 7 and in addition detects whether the cables are connected properly with regard to polarity; that is, the proper connection of each cable so that there is a like polarity connection at each end of the cable. With the system of FIG. 8 battery cable connection is permitted only after all clamp switches are closed and there is the proper polarity match up between the batteries.

Part of the system of FIG. 8 is substantially identical to the diagram of FIG. 7. Thus, cable 54 interconnects the jumper cable clamps 55 and 56. All of the jumper cable clamps shown in FIG. 8 may be of the type previously depicted in FIG. 6. Jumper clamp 58 connects to cable 60 while the jumper cable clamp 57 connects to 59. The cables 59 and 60 connect to the heavy duty switch contact 61 controlled from relay coil 62.

As with the embodiment of FIG. 7 the rectifiers 63 and 64 are wired across battery cables 54 and either cable 59 or cable 60. With this arrangement there is a positive voltage on wire 65 and a negative voltage on wire 66, regardless of how the cable pairs are connected at each battery. Thus, for example, regardless of which of the clamps 55 and 57 are connected to which terminal of the battery with which they are associated, a positive voltage will be on line 65 and a negative voltage on line 66.

The diagram of FIG. 8 includes distribution block 72 which receives the positive voltage from line 65. The distribution block comprises a zener diode 75 for providing a regulated voltage of +5 vdc which is used with the logic circuitry such as the gates shown in FIG. 8. The distribution block 72 also delivers power to amplifier 73, solenoid 62 and indicator light 74.

A line from cable 59 is fed through voltage dropping resistor 77R to AND gate 76 and also to NOR gate 77. Similarly, a line from cable 60 is coupled by way of voltage dropping resistor 76R to the other inputs on gates 76 and 77. The outputs from the gates 76 and 77 couple to the two inputs of OR gate 79. The output from gate 79 is coupled to one input of a total of 5 inputs on AND gate 80. The output from gate 79 also couples to inverter 81. The output from inverter 81 couples to a red LED indicator 82.

The control switch arrangement of FIG. 8 is somewhat different than the arrangement shown in FIG. 7. In FIG. 8 the actual switches 51, 67, 68 and 69 are not shown but each have one side connecting respectively with lines 85, 86, 87 and 88. There is also provided a common line 84 which receives a +5 vdc signal by way of resistor 83. This voltage level in essence couples to one side of each of the control switches. Thus, when each jumper cable clamp is relaxed there is a positive voltage on its associated line which is either line 85, 86, 87 or 88. These lines all couple into the other inputs of gate 80.

The gates 76, 77 and 79 detect whether the cables are connected to the correct battery terminals. If jumper cable clamps 57 and 58 are both on a positive terminal, then the two positive voltages at the input of gate 76 provide a positive output from this gate. Similarly, if the clamps 57 and 58 are both on a negative terminal, then the two negative voltages at the input of gate 77 produce a positive output from that gate. If the clamps 57 and 58 are on different polarity terminals, both of the gates 76 and 77 will have a low inhibiting output.

In summary, when both clamps 57 and 58 are on positive terminals, there is a positive output from gate 76 and gate 79 will be enabled providing an enabled signal for the gate 80. If both of these same clamps are on negative terminals, then the gate 77 will have a positive output rather than the gate 76 enabling in turn gates 79 and 80. Under the other conditions there is no positive output from gate 79 but this condition is sensed by inverter 81 which will illuminate the indicator light 82 under this condition of improper connection at the battery terminals.

Thus, the gate 80 will only have a positive input coupled from the gate 79 when the battery cables are connected properly. Further, the gate 80 will be totally enabled having a positive output when that condition is satisfied and also when the battery cable clamps are all closed as determined by the position of the switches 51, 67, 68 and 69 (not shown in FIG. 8). In FIG. 8 the switch conditions are coupled on the lines 85-88 to gate 80.

The output from gate 80 couples to amplifier 73 which arms the actuator switch 71 and the latching contact 70. The output from amplifier 73 also illuminates a green incandescent "go" indicator light 74. Switch 71 is preferably a normally-open momentary pushbutton switch. Closing switch 71, when armed by virtue of gate 80 being enabled, solenoid 62 is energized, closing the contact 70 thereby holding the solenoid 62 in this actuated state. The operation of solenoid 62 also closes which contact 61, which as in the embodiment of FIG. 7, connects the jumper cables 59 and 60.

In summary, the gate 80 has inputs that determine the two conditions of proper battery connection and battery clamp switch closure. If the proper polarity connections have been made and all of the clamps are secured on the battery terminals, then the gate 80 is totally enabled having a high output. With the switch 71 subsequently operated, because of this "go" condition, the battery cables are then interconnected through the contact 61. Thereafter, if any one of the jumper cable clamps are released, the gate 80 has a low output and the power to the relay 62 is interrupted. When this occurs, the associated contact 61 opens. This action occurs as soon as there is a slight squeezing of the cable clamps and the disconnection via contact 61 actually occurs before the clamps are physically removed from the terminals. If the removed clamp is again inserted on the terminal, the switch 71 must again be actuated in order to provide battery cable interconnection.

Figure 9:
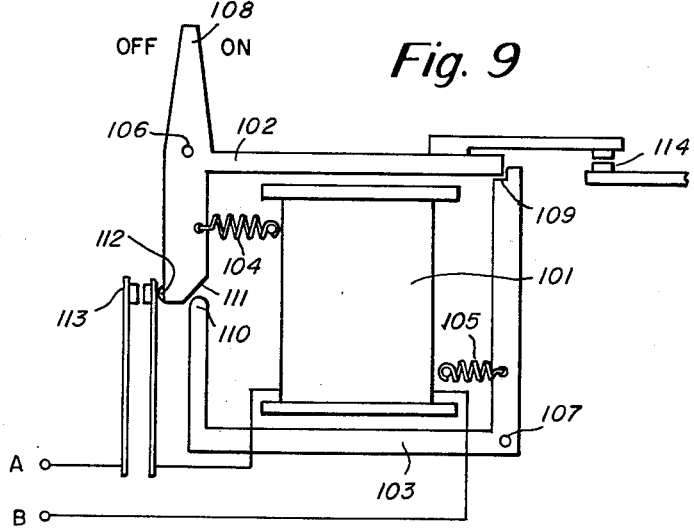
FIG. 9 is a diagram of an alternate embodiment employing a manually operated self-holding relay.

FIG. 9 shows an alternate embodiment of a relay that may be used, for example, in place of the relay 62 and associated switch 71 shown in FIGS. 7 and 8. This relay is a manually-operated, self-holding relay. The relay of FIG. 9 may in addition be used in other applications and is in itself an improvement over previous relay constructions.

There are many applications where a relay is maintained in the "hold-in" position. By the closing of a switch typically, such relays are actuated by another switch which supplies initial power to the relay energizing the relay until the closing or latching contact is closed to hold the relay actuated. One drawback of the conventional arrangement is that two switch contacts are required, and secondly, relatively substantial power is required for energizing the relay; this power being greater than the power required to hold the relay in the locked position.

One objective of the improved relay of FIG. 9 is to supply a latching relay which employs preferably only one switch which serves as both the actuating and the latching or lock-in switch. A further objective of the invention is to supply a latching relay which does not require an initial surge of high power to initiate the relay action. The foregoing objectives are accomplished by providing a relay which has two armatures. One of the armatures forms a part of the actuating switch and operates the latching contact of the relay.

The other armature serves to lock out the first armature.

FIG. 9 shows the relay coil 101 having opposite end poles. The other armatures 102 and 103 are disposed adjacent these poles of the coil 101. The armature 102 is biased away from one pole of the coil 101 by means of the spring 104. Similarly, a second spring 105 is provided for biasing the second armature 103 away from the other pole of the relay coil 101. The armatures 102 and 103 are pivotal about the pivot pins 106 and 107, respectively.

The armature 102 integrally provided therewith a paddle switch handle 108 having alternate off and on positions as indicated in FIG. 9. The armature 102 also has a right angle extension which terminates with an angular surface 111 having adjacent thereto a switch actuating protrusion 112. The armature 103 is of substantially U-shape terminating at one end in a notch 109. The other end is rounded as shown at 110.

In FIG. 9 the switch contact 113 operated by the protrusion 112 is a relay actuating and hold-in switch. The other contact 114 is the high power transfer switch which may couple to high power terminals not shown in FIG. 9.

The terminals A and B shown in FIG. 9 connect to a power source for the relay. When there is power at these terminals the relay is armed. The switch 108 may then be moved to its "on" position causing the armature assembly 102 to rotate clockwise. This action causes the protrusion 112 to close the switch contact 113 and if the power terminals are armed, the relay coil 101 is energized. This action causes the relatively light weight armature 103 to be attracted to the bottom coil pole. When this occurs the armature 103 rotates clockwise against the bias spring 105 so that the notch 109 moves away from the end of the heavier armature 102 allowing it to move toward the top pole of relay coil 101. When the armature 103 is operated, its end 110 moves against the angled edge 111 of armature 102, urging it in the initial direction of movement. With the notch 109 out of the path of travel of armature 102 the movement of armature 102 may continue with the assistance of armature 103 movement and its end 110. The movement of armature 102 continues until it is seated against the top pole of coil 101.

It is noted that the actual movement of armature 102 is by manual operation of the switch 108. Also, the relay unit remains in the latched state as long as power is maintained at the terminals A and B and as long as the switch contact 113 is closed. When power is removed from the terminal A and B, spring 104 moves armature 102 along with switch 108 to its "open" relaxed position. At the same time the spring 105 moves the armature 103 to its relaxed position. With the relay device of FIG. 9 if there is no power at the terminals A and B, a movement of the switch handle 108 toward the "on" position is inhibited, a virtue of the end of the armature encountering the notched end 109 of the other armature 103.

One of the important features of the device shown in FIG. 9 is that a smaller less expensive coil 101 may be used. The power to hold in the relay is generally less than the power that is necessary to pull in the relay and because the pulling in of the relay is assisted by manual movement of the armature 102 an inexpensive coil may be used as only enough power need be provided to hold the relay contacts latched.

Having described a limited number of embodiments of this invention it should now be apparent to those skilled in the art that there are numerous other embodiments all of which are considered as falling within the scope of this invention and all of which are to be limited only by the appended claims.

What is claimed is:

1. Jumper cable apparatus comprising;
   a pair of electrical cables each having on either end clamp means enabling connection of the cables to battery terminals,
   and switch means in at least one of said cables and having a connecting position and a disconnecting position,
   each clamp means having an actuating handle and associated control switch at the handle operated by squeezing the handle.

2. Jumper cable apparatus as set forth in claim 1 wherein said switch means includes a bi-state device operable by having all control switches in their enabling position.

3. Jumper cable apparatus as set forth in claim 2 wherein the enabling position of the control switches is a closed position possible when the clamp means is relaxed.

4. Jumper cable apparatus as set forth in claim 3 including means coupling all control switches in series and an actuating switch for operating the bi-state device also in series with the control switches.

5. Jumper cable apparatus as set forth in claim 4 including rectifier means coupled across the electrical cables for providing opposite polarity voltage levels for operating the bi-state device.

6. Jumper cable apparatus as set forth in claim 2 including rectifier means coupled across the electrical cables for providing opposite polarity voltage levels for operating the bi-state device.

7. Jumper cable apparatus as set forth in claim 2 wherein said bi-state device includes a relay means having a contact for making and breaking the cable connection and a second latching contact.

8. Jumper cable apparatus as set forth in claim 2 including means for arming said bi-state device when all control switches are enabled and when the clamp means associated with one of the cables match in polarity of connection at the battery.

9. Jumper cable apparatus as set forth in claim 8 wherein said means for arming includes logic means for sensing polarity at opposite ends of one of the electrical cables.

10. Jumper cable apparatus as set forth in claim 9 including gate means for sensing like polarities at cable ends to thereby enable operation of the bi-state device.

11. Jumper cable apparatus as set forth in claim 10 including an AND gate receiving an enabling polarity match up signal and signals from all control switches, an amplifier coupling from the output of the AND gate to the bi-state device, and an actuating switch for operating the bi-state device.

12. Jumper cable apparatus comprising;
   a pair of electrical cables each having on either end clamp means enabling connection of the cables to battery terminals,
   and switch means in at least one of said cables and having a connecting position and a disconnecting position,
   each said clamp means having an actuating handle and means at least in part at the handle operated by squeezing the handle to in turn control the position of said switch means.

13. Jumper cable apparatus as set forth in claim 12 wherein at least one of said clamp means includes an actuating handle for operating a movable means coupling from the handle to the switch means for operating the switch means.

14. Jumper cable apparatus as set forth in claim 13 wherein the handle is pivotally supported from the clamp so that upon initial squeezing of the clamp the switch means goes to the disconnect position prior to disconnection of the clamp means at the battery terminal.

15. Jumper cable apparatus as set forth in claim 14 including actuating handles associated with all clamp means and connecting each by way of a movable line to a common actuating member which operates the switch means.

* * * * *